United States Patent
Sullivan (10) Patent No.: US 8,698,735 B2
(45) Date of Patent: Apr. 15, 2014

(54) CONSTRAINED VIRTUAL CAMERA CONTROL

(75) Inventor: Steve Sullivan, San Francisco, CA (US)

(73) Assignee: LucasFilm Entertainment Company Ltd., San Francisco, CA (US)

(*) Notice: Subject to any disclaimer, the term of this patent is extended or adjusted under 35 U.S.C. 154(b) by 2028 days.

(21) Appl. No.: 11/532,475

(22) Filed: Sep. 15, 2006

(65) Prior Publication Data

US 2008/0094358 A1    Apr. 24, 2008

(51) Int. Cl.
*G09G 5/00*    (2006.01)

(52) U.S. Cl.
USPC ........... 345/156; 345/161; 345/168; 345/173; 345/690

(58) Field of Classification Search
USPC ................... 345/156, 161, 168, 173
See application file for complete search history.

(56) References Cited

U.S. PATENT DOCUMENTS

| | | | |
|---|---|---|---|
| 6,184,867 B1 | 2/2001 | Kandogan et al. | |
| 6,222,525 B1 | 4/2001 | Armstrong | |
| 6,906,700 B1 | 6/2005 | Armstrong | |
| 6,981,229 B1 | 12/2005 | Balakrishnan et al. | |
| 2002/0089541 A1* | 7/2002 | Orbanes et al. | 345/764 |
| 2005/0119050 A1* | 6/2005 | Suzuki | 463/36 |
| 2005/0225559 A1* | 10/2005 | Robertson et al. | 345/581 |
| 2006/0109266 A1* | 5/2006 | Itkowitz et al. | 345/419 |

OTHER PUBLICATIONS

Shaw et al., "Two-Handed 3D Editing", 5 pages, printed on Mar. 22, 2006.
Pluginz.com, "3Dconnexion Launches Motion Controllers for DCC", printed on Mar. 22, 2006, 2 pages.
Drucker et al., "CamDroid: A System for Implementing Intelligent Camera Control", pp. 139-144; 1995 Symposium on Interactive 3D Graphics, Monterey, CA, copyright 1995.
Khan et al., "HoverCam: Interactive 3D Navigation for Proximal Object Inspection", pp. 73-80, The Association for Computing Machinery, Inc., copyright 2005.
*3Dconnexion*, "SpaceTraveler: Goes Where you Go", 1 page, printed on Mar. 22, 2006.
Zeleznik et al., "Two Pointer Input for 3D Interaction", pp. 115-120, 1997 Symposium on Interactive 3D Graphics, Providence, RI, copyright 1997.
Hanson et al., "Constrained 3D Navigation with 2D Controllers", pp. 175-182, copyright 1997 IEEE.
Gleicher et at, "Through-the Lens Camera Control", pp. 331-340, Computer Graphics 26(2), Jul. 1992.

\* cited by examiner

*Primary Examiner* — William Boddie
*Assistant Examiner* — Leonid Shapiro
(74) *Attorney, Agent, or Firm* — Kilpatrick Townsend & Stockton LLP

(57) ABSTRACT

A method is described that includes receiving, from a first device, input used to select a first object in a computer-generated environment. The first device has at least two degrees of freedom with which to control the selection of the first object. The method also includes removing, in response to the selection of the first object, at least two degrees of freedom previously available to a second device used to manipulating a second object in the computer-generated environment. The removed degrees of freedom correspond to the at least two degrees of freedom of the first device and specify an orientation of the second object relative to the selected first object. Additionally, the method includes receiving, from the second device, input including movements within the reduced degrees of freedom used to manipulate a position of the second object while maintaining the specified orientation relative to the selected first object.

15 Claims, 11 Drawing Sheets

CONSTRAINED VIRTUAL CAMERA CONTROL

TECHNICAL FIELD

This specification relates to systems and methods for constrained virtual camera control.

BACKGROUND

Navigating in three-dimensional environments, such as in animation software programs, can be disorienting and difficult for users because of an availability of multiple degrees of freedom in navigation of the environments with respect to common input devices. Some current systems enable users to navigate using a mouse and keyboard. With a mouse, a user has control over two degrees of freedom, namely control over the x and y directions. If a user wants to move in a z-direction (e.g., toward or back from an object in the 3D environment), the user can select a key on the keyboard. The selection of the key may modify the function of the mouse so that a horizontal movement of the mouse (e.g., a movement in the x direction), is mapped to a forward or backward movement (e.g., a movement along the z direction). The mapping of navigations from one degree of freedom to another degree of freedom, however, can be counter-intuitive to users.

Other systems may enable a user to navigate using a single device with up to seven degrees of freedom in movement. For example, a 3D motion controller may permit a user to control a virtual camera so that it can move horizontally, move vertically, move forward or backward, pan, tilt, or roll, or zoom. It may be difficult, however, for user to navigate around an object in a 3D environment because the user may have to compensate continually while trying to view objects in the environment. For example, a user may have to keep compensating in the x and y directions while tilting and panning a virtual camera so that an object that the camera is viewing stays within the camera's view.

SUMMARY

In general, this document describes constraining a virtual camera's viewpoint.

In certain implementations, a method is described for manipulating, in a computer-generated environment, an object relative to a different selected object while maintaining a specified orientation relative to the selected object. The method includes receiving, from a first device, input used to select a first object in a computer-generated environment. The first device has at least two degrees of freedom with which to control the selection of the first object. The method also includes removing, in response to the selection of the first object, at least two degrees of freedom previously available to a second device used to manipulating a second object in the computer-generated environment. The removed degrees of freedom correspond to the at least two degrees of freedom of the first device and specify an orientation of the second object relative to the selected first object. Additionally, the method includes receiving, from the second device, input including movements within the reduced degrees of freedom used to manipulate a position of the second object while maintaining the specified orientation relative to the selected first object.

In other implementations, a system for manipulating one object relative to another object in a computer-generated environment is described. The system includes a selection device having at least two degrees of freedom for selecting a first object in a computer-generated environment, a navigation device having at least three degrees of freedom for positioning a second object in the computer-generated environment, and a camera control system for reducing the at least three degrees of freedom of the navigation device by fixing two of the at least three degrees of freedom so that the second object remains in a specified orientation relative to the selected first object, but the second object remains free to be positioned using degrees of freedom that remain unfixed.

The systems and techniques described here may provide one or more of the following advantages. First, a system may increase the convenience of maintaining a selected object within the view of a virtual camera during camera repositioning. Second, a system can reduce compensation motions used when a virtual camera is manipulated around an object, which may increase the speed and accuracy of performing the manipulations. Third, a system may provide an intuitive method for navigating around objects in a 3D environment. Fourth, a system may enable a user to switch between a specialized navigation function around an object and conventional navigation functions. Fifth, a system may allow a user to specify 2 dimensional visual relationships in a view of a 3 dimensional scene.

The details of one or more embodiments are set forth in the accompanying drawings and the description below. Other features and advantages of the embodiments will be apparent from the description and drawings, and from the claims.

DESCRIPTION OF DRAWINGS

These and other aspects will now be described in detail with reference to the following drawings.

Like reference symbols in the various drawings indicate like elements.

DETAILED DESCRIPTION OF ILLUSTRATIVE EMBODIMENTS

Figure 1A:
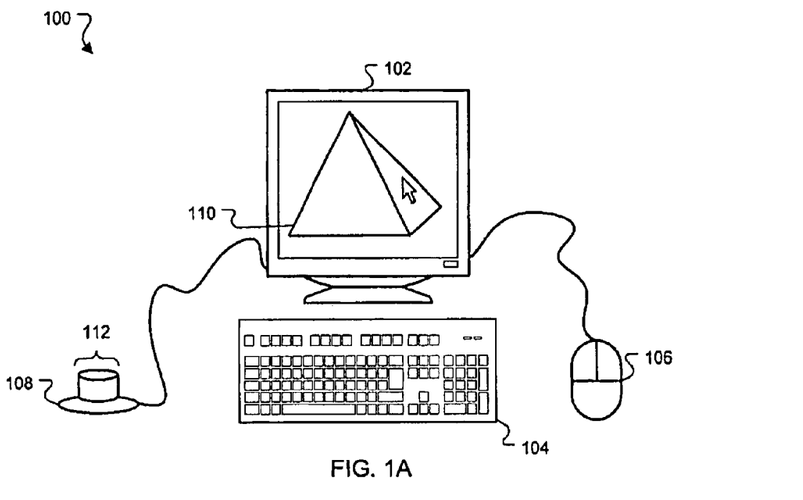
FIGS. 1A and 1B are illustrative system diagrams showing a system that is capable of displaying and editing three-dimensional (3D) images.

FIG. 1A shows an illustrative computer system 100 that is capable of displaying and manipulating three-dimensional (3D) graphics. The computer system 100 includes a display 102, a keyboard 104, a handheld pointing device 106 (e.g., a mouse), and a motion controller 108. In this example, the display 102 shows a 3D object 110. A user, such as a computer aided design (CAD) designer, a 3D animation artist, or other 3D graphics designers, can obtain different views (e.g., a top view, side views from different angles, etc.) of the 3D object 110 by moving a virtual camera around the 3D object 110. In this example, the user can change from one view to another view of the 3D object 110 by first selecting the 3D object 110 using the handheld pointing device 106, and second, by navigating the camera around the selected 3D object 110 using the motion controller 108 to orbit around the object.

The computer system 100 can be a desktop computer, a handheld computer, a laptop, or another 3D image-displaying device. In some embodiments, the user can have different selecting devices or motion control devices than those depicted in FIG. 1A. For example, the user can use the keyboard 104 to select the 3D object 110. In another example, the display 102 can be a touch screen and the user can use his finger to select the 3D object 110. In other examples, the user can also select the 3D object 110 using a stylus or a touch pad.

In some embodiments, the motion controller device 108 can be a gaming controller, such as a joystick or a joypad. In other embodiments, the motion controller device 108 can also be a controller designed specifically for 3D motion control. One example of a 3D motion controller is a SpaceTraveler, developed by 3Dconnexion Corporation of San Jose, Calif.

A virtual camera can navigate in a 3D image using at least seven degrees of freedom, where each of the degrees can specify a position, an orientation, and a field of view of the camera relative to an object in the 3D image. For example, three degrees of freedom may include the ability to move the virtual camera in each of the three dimensions (e.g., x, y, z dimensions defined by corresponding axes). The remaining three degrees of freedom can include the capability to move the camera around the axes that define the first three degrees of freedom (e.g., rotating around each of the x, y, z-axes) while the view from the camera remains focused on the object in the 3D image. More explicitly, the seven degrees of freedom defined in a 3D image can include moving vertically, moving horizontally, moving forward and backward, tilting (which is rotating with respect to the x axis), rolling (which is twisting with respect to the z axis), panning (which is rotating with respect to the y axis), and zooming (which is changing the field of view).

In some embodiments, the computer system 100 can represent the position of the camera relative to the seven degrees of freedom using seven coordinates (e.g., x, y, z, t [tilting], r [rolling], p [panning], f [field of view]). A change of one or more of the seven coordinates can change the position or the orientation of the camera, resulting in a change in the camera's view.

As discussed above, the motion controller 108 can be configured to provide at least seven degrees of freedom when manipulating a virtual camera. The motion controller 108 includes a handle 112 that allows a user to control the camera. In some examples, the configuration of the motion controller 108 can be customized. For example, a user can configure the motion controller to orbit the virtual camera in a leftward direction around an object when the user applies a leftward horizontal pressure to the handle 112. In other configuration examples, when a target object is selected, a user can twist the handle 112 counter-clockwise to orbit the camera around the object in a counter-clockwise rotation. Additionally, in some configurations, moving the handle 112 forward and backwards with horizontal pressure may move the camera toward the object or away from the object, respectively, while remaining centered on the object. Pressing down and lifting up on the handle can move the camera down or up while remaining centered on the selected object.

To zoom, a user can press a button on the motion controller simultaneously with applying horizontal pressure on the handle. The zooming can decrease the field of view to focus on a particular selected point on the image. Without the use of the button, horizontal pressure on the handle may return to the previously described function of moving the camera forward and backward relative to the selected object. Of course, the movements of the handle and the corresponding movement of the camera can be mapped in several different ways, and these examples only describe a subset of the possibilities.

Using the handheld pointing device 106 and the motion controller 108, a user can restrain, or fix, one or more of the degrees of freedom and substantially simplify controlling the camera. In some embodiments, the user can select, using the handheld pointing device 106, a point in the image at which one or more degrees of freedom is restrained.

For example, the user can restrain the camera so that it cannot be manipulated in the x or y dimensions relative to a selected point. The user can select the 3D object 110 to be at the center of camera movements, leaving the camera with only four degrees of freedom (e.g., z, t, r, p) relative to the selected object 110. An animation artist can use the handheld pointing device 106 to select the 3D object 110 and obtain different views of the selected 3D object 110 by navigating the camera around the 3D object 110 using the motion controller 108 to manipulate the unrestrained four degrees of freedom.

Restrainment of the degrees of freedom, however, is not limited to eliminating all movement within a dimension, but instead, the restraint may limit permissible movements to a proper subset of movements within a dimension. For example, a user can constrain a camera so that it cannot be manipulated outside of a range of x and y values. The camera, however, can be manipulated in both x and y dimensions (e.g., points on the axes) within the range. Selecting a point on an object with the pointing device 106 (e.g., mouse) while orbiting will still allow the user to move the virtual camera in all dimensions, but only within a restricted combination of translations and orientations.

In certain embodiments, the virtual camera is constrained in the following way. Once a point on an object is selected with the pointing device 106, the selected point can define a 3D ray in space, starting at the camera origin and extending through the selected point on the object. Information associated with the ray, including its orientation with respect to the virtual camera, can be stored.

When the motion controller 108 transmits input to manipulate the camera, the virtual camera can be moved incrementally in a direction indicated by the controller (e.g., to the left of the screen). After the potential new camera location and orientation are computed, a new ray may be calculated, where the new ray extends from the virtual camera's new position to the selected point on the object. The system can compute the rotation required of the virtual camera to align the new ray with the stored ray and apply a corresponding new orientation to the virtual camera.

In other embodiments, the virtual camera is constrained by aligning an object ray with a desired ray. For example, a user may be selecting and positioning (e.g., dragging) a selected object in a computer-generated environment, but not manipulating a virtual camera with the motion controller. The user may desire to position and orient the camera so that the user views the object from the camera at a desired perspective. To accomplish this, a "desired" ray is computed, where the desired ray passes through a point on the selected object from an eye of the camera, which is positioned and oriented to obtain the desired perspective. An "object" ray is also calculated, where the object ray originates from current position of the camera and passes through the object. The camera then may be translated so that the object ray aligns with the desired ray. If translation degrees of freedom are removed or restricted for the camera (e.g., the camera is designated as only a pan or tilt camera), then an alignment rotation can be computed instead of computing the translation for the camera.

Figure 1B:
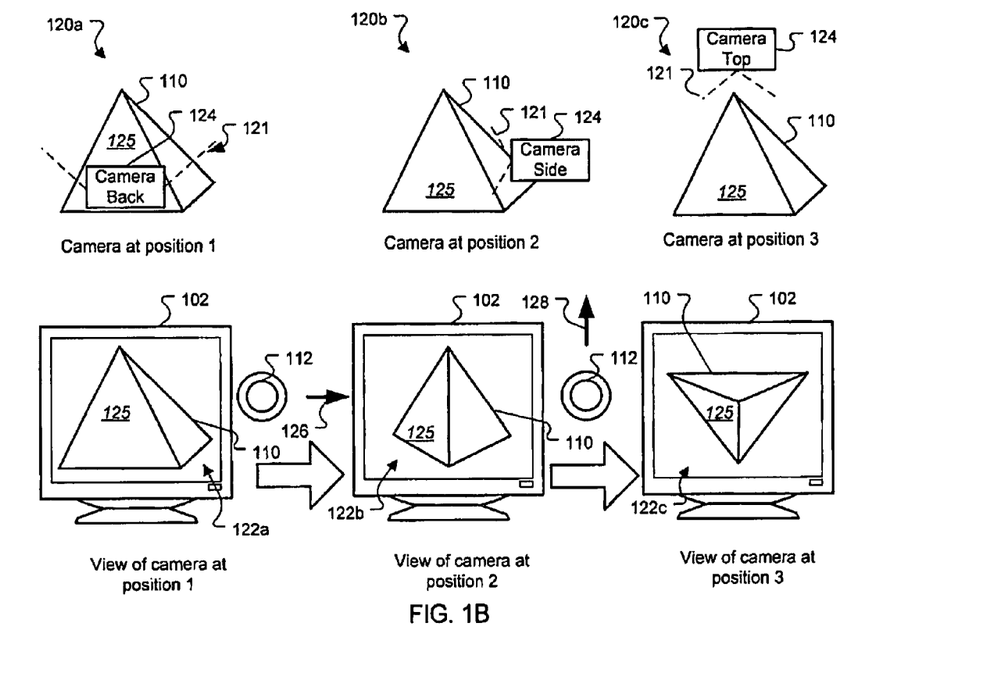

FIG. 1B shows three exemplary positions 120a, 120b, and 120c of a camera's placement and the corresponding views 122*a*, 122*b*, and 122*c* a user would see of a 3D object's surface 125. A camera 124 captures the 3D object 110 in the positions 102*a-c*. The camera's field of view is shown by the dashed lines 121. In the position 120*a*, the back of the camera 124 is facing the user. The user perceives the 3D object's surface 125, as shown in the image 122*a*.

To move the camera 124 to a different position relative to the object, the user can use the handheld pointing device 106 to select the 3D object 110 and move the camera 124 while centered on the 3D object 110. For example, the user can navigate the camera 124 from the position 120*a* to a second position 120*b* by moving the handle 112 of the motion controller 108 to the right, indicated by an arrow 126. In response, the display 102 can show the corresponding view 122*b*, which shows the 3D image rotated to the left.

In another example, the user can move the camera 124 from the second position 120*b* to a third position 120*c* by moving a handle of the motion controller 108 forward, indicated by an arrow 128. In response, the display 102 can show the corresponding view 122*c*, which shows a top view of the 3D image.

Figure 2A:
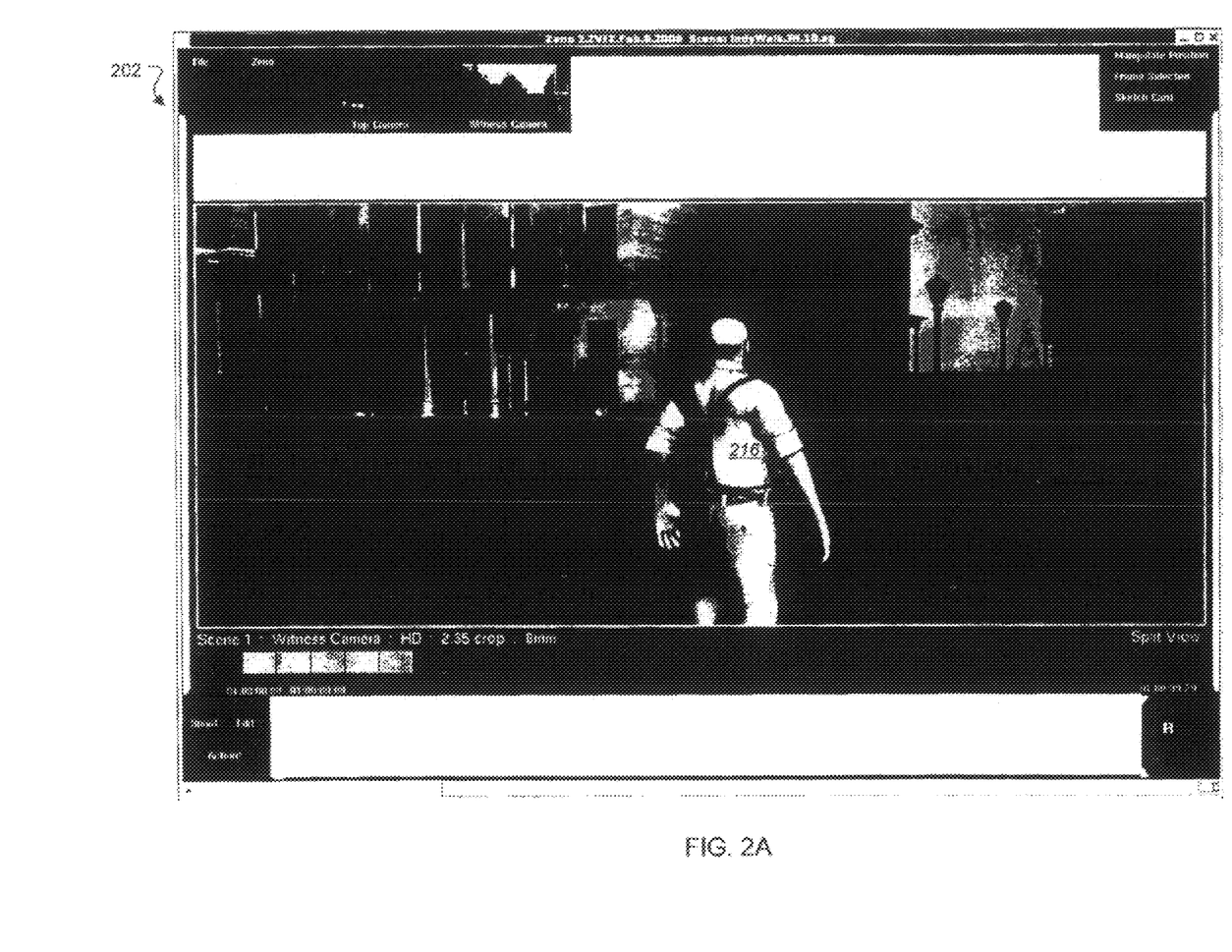
FIGS. 2A-2G are screenshots showing changes on a screen when a camera orbits around and moves towards a 3D object.
Figure 2B:
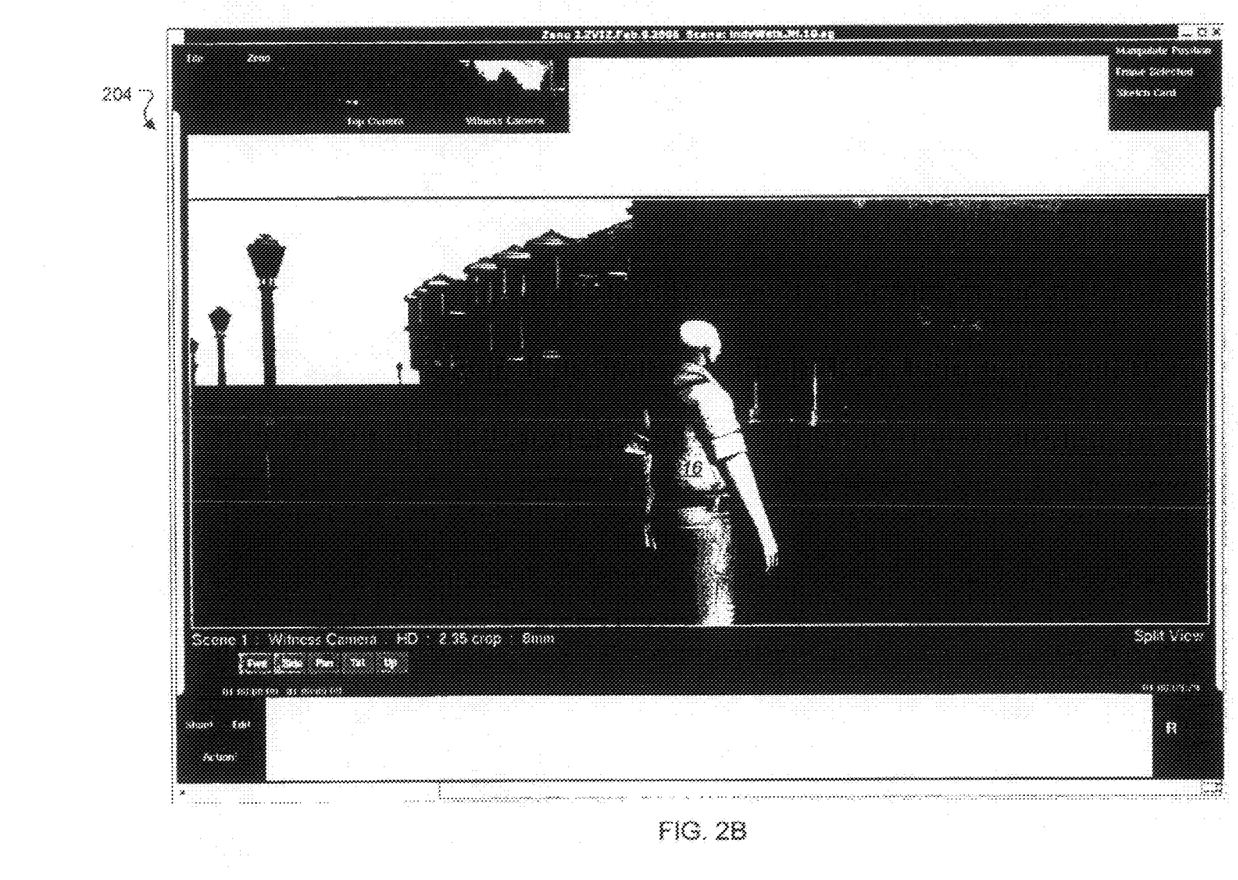
Figure 2C:
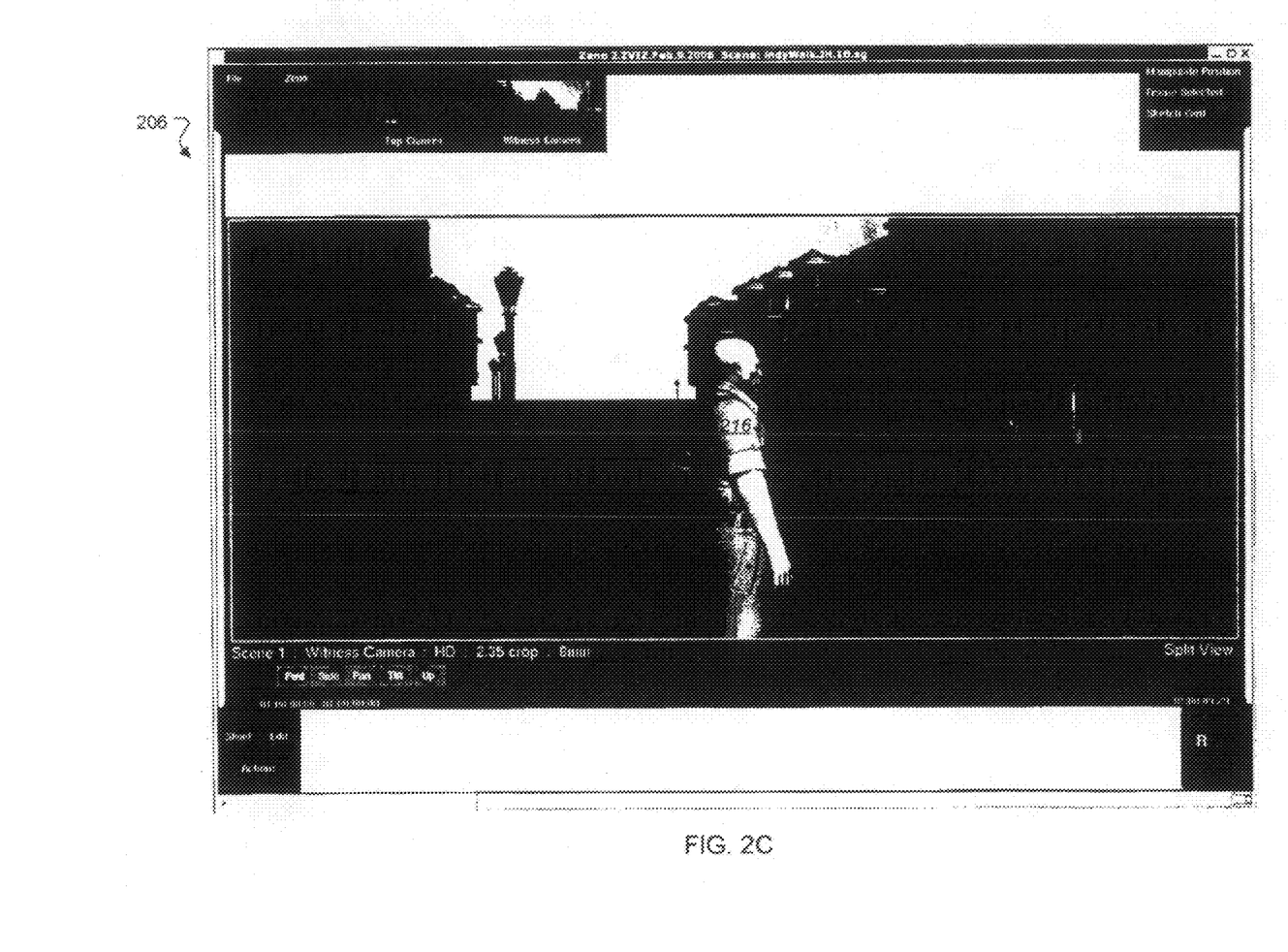
Figure 2D:
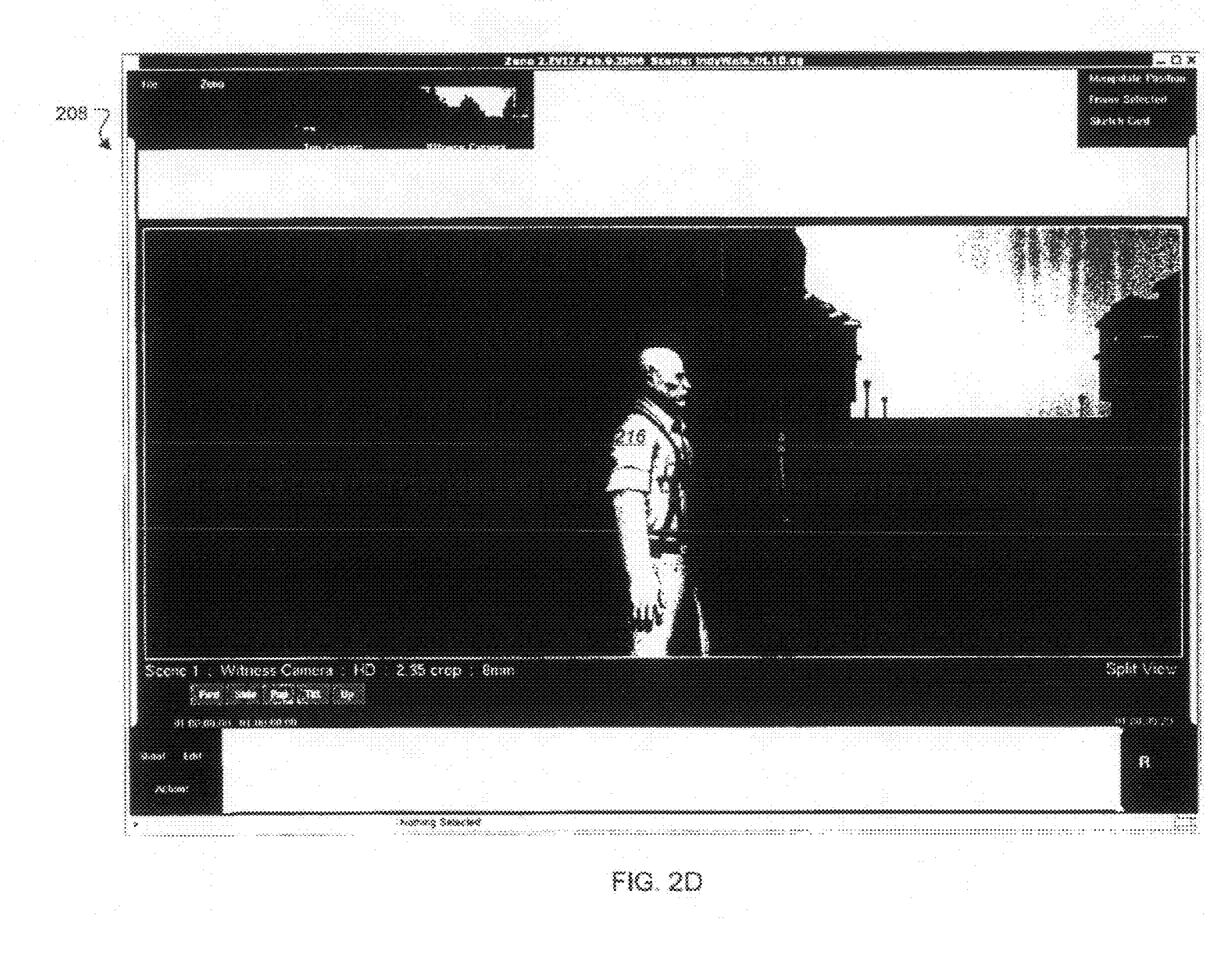
Figure 2E:
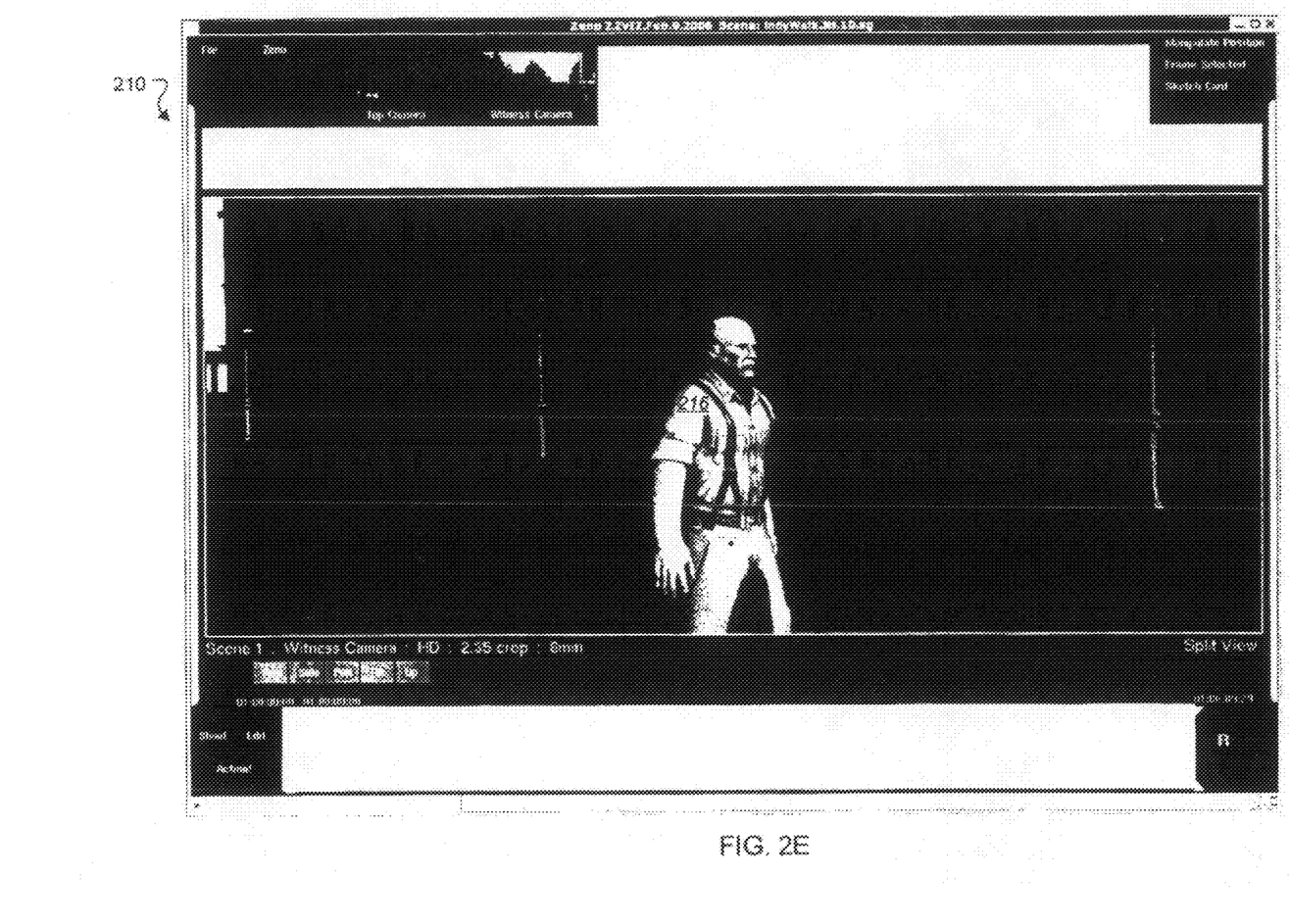

FIGS. 2A-2G are screenshots 202, 204, 206, 208, 210, 212, and 214 that can be viewed in the display 102. The screenshots 202, 204, 206, 208, 210, 212, and 214, illustrate how a user can manipulate a camera around a 3D object in the display 102 by selecting the 3D object with the pointing device 106 and manipulating the remaining degrees of freedom for the camera using the motion controller 108. As shown in FIG. 2A, the user can select a person 216. The user can make the selection by depressing a mouse button and then releasing it.

The screenshot 202 of FIG. 2A shows the camera currently positioned behind the person's back. The user may use the motion controller 108 and move the camera to the right of the person 216 by applying a rightward pressure to the handle 112, which moves the camera to a viewpoint illustrated in the screenshot 204 shown in FIG. 2B. The user may continue hold the handle 112 to the right, which moves the camera to a position illustrated by the screenshot 206 shown in FIG. 2C. If the user continues to apply rightward pressure to the handle 112, the camera can continue to rotate around the person 216, as shown in screenshots 208, 210, and 212, shown in FIGS. 2D-2F, respectively.

By restraining the degrees of freedom of the virtual camera, the user may smoothly move the virtual camera around a fixed object (e.g., the person 216). The system 100 may substantially minimize compensation movements by restraining the camera movements to degrees of freedom relative to the fixed object. For example, if the object was not fixed at an x and y point, a user may have to continually make adjustments to keep the object at the center of the navigation at the same time the user is navigating around the object. Fixing the object around which to navigate, may also increase the accuracy of the movements around the object by substantially eliminating extra compensation movements that might negatively affect navigation around the fixed object (e.g., overshooting compensation may affect the navigation by requiring several additional compensation movements in multiple directions to correct the original overshoot).

Figure 2F:
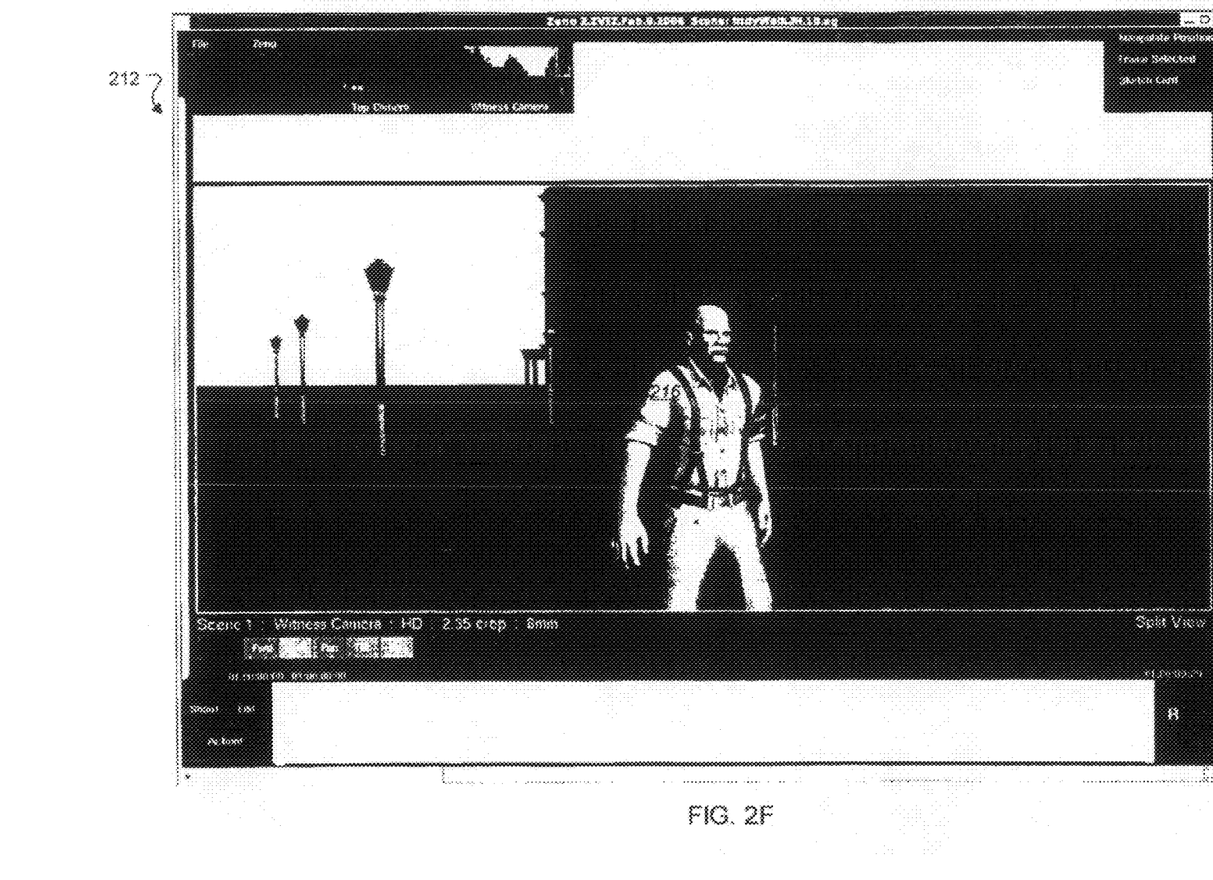
Figure 2G:
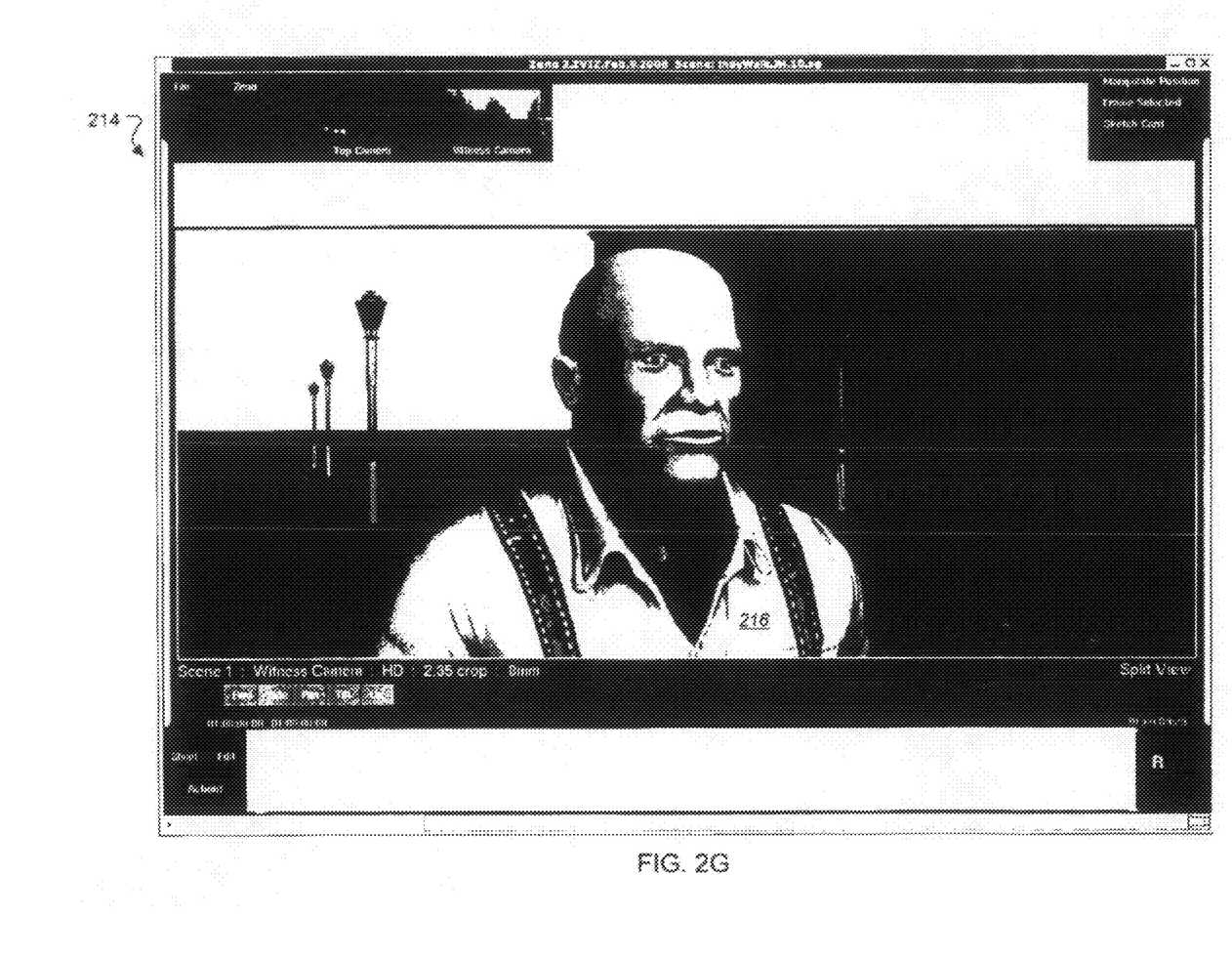

As illustrated by the screenshots 212 and 214 of FIGS. 2F and 2G, respectively, the user can move the camera forward toward the person 216, for example, by pushing the handle 112 forward to move toward the person 216. Because the person's head is selected by the pointing device 106, the camera zooms in along a z-axis intersecting a selected point on the person's head.

Figure 3:
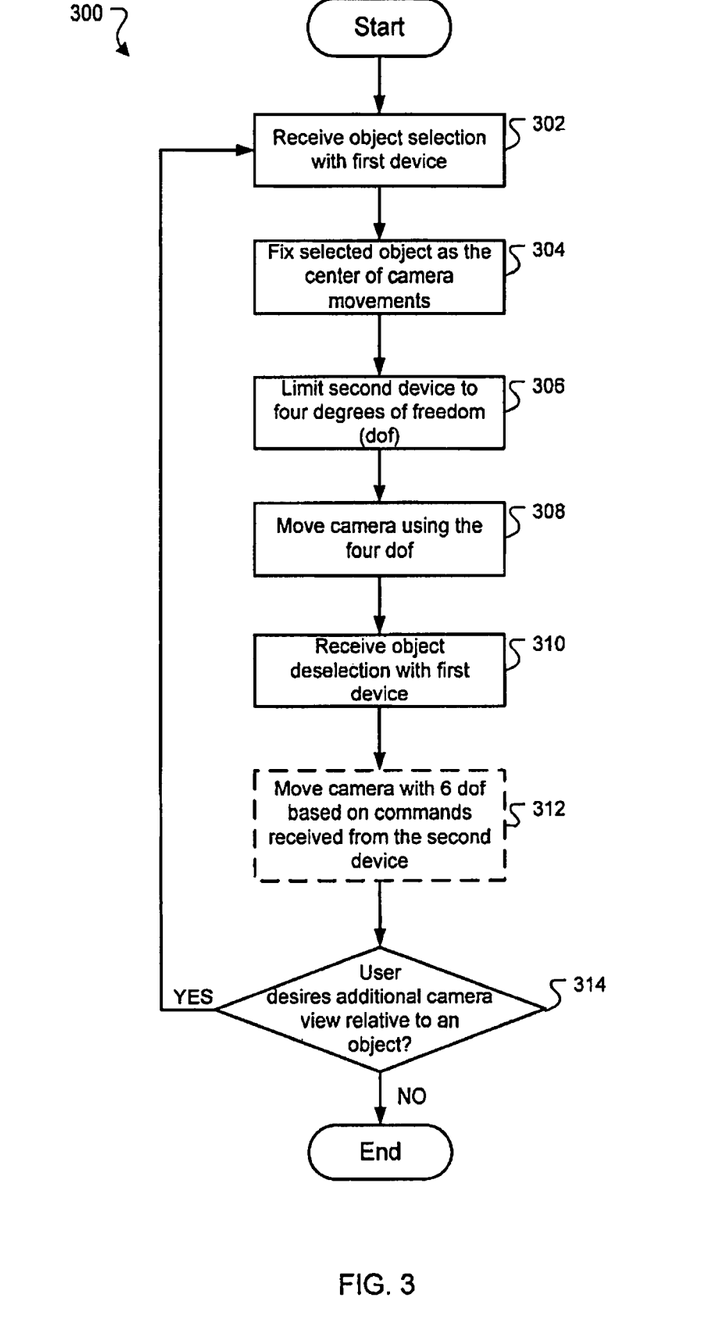
FIG. 3 is an illustrative flowchart of a method that is capable of providing smooth camera navigation in a three dimensional image.

FIG. 3 shows an illustrative flowchart of a method 300 that is capable of providing smooth camera navigation around a 3D object. In some embodiments, the method 300 can be performed under the control of a processor or control logic in the computer system 100. For example, the computer system 100 can include a processor that performs the illustrated operations to navigate the camera around a 3D object.

The method 300 begins when the computer system 100 receives, in step 302, a command to select the 3D object using a first device, such as the handheld pointing device 106. After the selection, the computer system 100 fixes the selected object as a center point of camera movements (e.g., the camera's view remains centered on the selected object) in step 304. When an object is fixed as the center point of the camera's movement, one or more degrees of freedom for the camera's movement can be restricted relative to the selected object. For example, x and y movements of the camera can be restricted relative to the selected object.

In step 306, the computer system 100 limits the control of a second device, such as the motion controller 108, so that the second device controls the degrees of freedom that were not fixed in step 304. For example, the computer system 100 may restrict camera movements to the four degrees of freedom that remain (movements along the z, t, r, and p-axes) after fixing the x and y movements.

The computer system 100 can move the camera in the unrestrained degrees of freedom specified by the user, as shown in step 308. For example, the user can move the camera horizontally around the selected object, but the camera's focus remains on the selected object fixed at an x and y point. The user can initiate this movement by manipulating the second device. For example, the computer system 100 may receive signals from the motion controller 108, as discussed with reference to FIG. 1. When the user moves the handle of the motion controller 108 to the left, the computer system 100 may orbit the camera horizontally to the left while the focus of the camera remains centered on the selected object.

After the user moves the camera to a desired position, the computer system 100, in step 310, can receive a deselection command from the first device. For example, if the user selects the object by moving a cursor over the object and depressing a button on the handheld pointing device 106, then the user can deselect the object by releasing the button. In another example, the user may select an object by depressing a button on the pointing device 106 and then releasing the button. To deselect the object, the user can depress and release the button again when the pointing device's cursor is over the selected object.

In some embodiments, the computer system 100 does not restrain the camera's degrees of freedom after the deselection. For example, the camera can move in seven degrees of freedom after the deselection, whereas before the deselection, the camera movement was limited to four degrees. After the degrees of freedom are regained, the user may optionally move the camera using all the possible degrees of freedom, as shown in step 312.

In step 314, the computer system 100 can determine whether the user desires additional camera views relative to an object. If the computer system 100 determines that the user desires additional camera view relative to an object, then the method returns to step 302. For example, the computer system 100 can determine that the user desires an additional camera view relative to an object when the computer system 100 receives another selection of an object, which may be the same 3D object or a different one. If an additional selection command is not received, the method 300 can end.

Figure 4A:
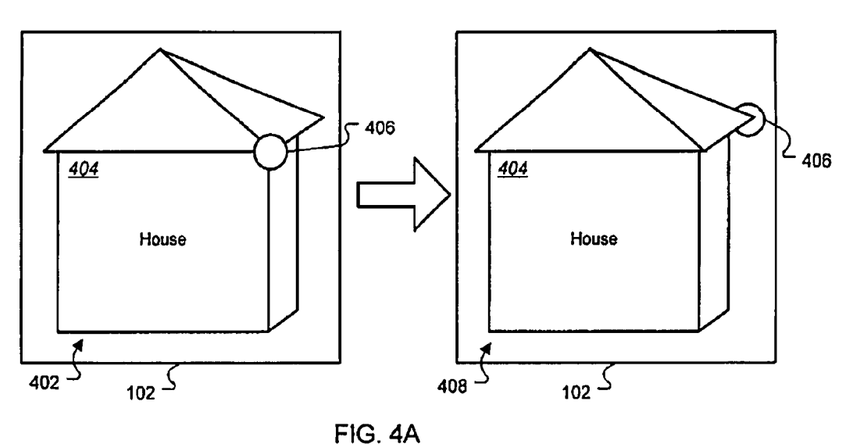
FIGS. 4A-4C are illustrative diagrams showing direct manipulation of 3D objects using the system of FIGS. 1A and 1B.
Figure 4B:
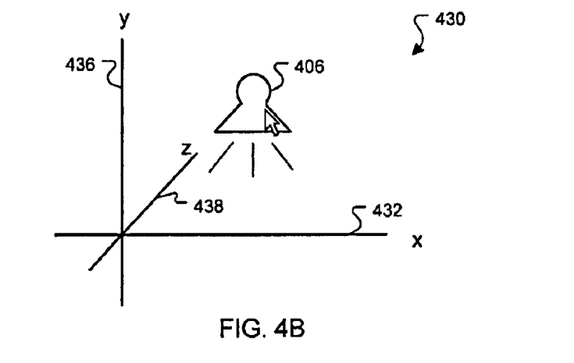
Figure 4C:
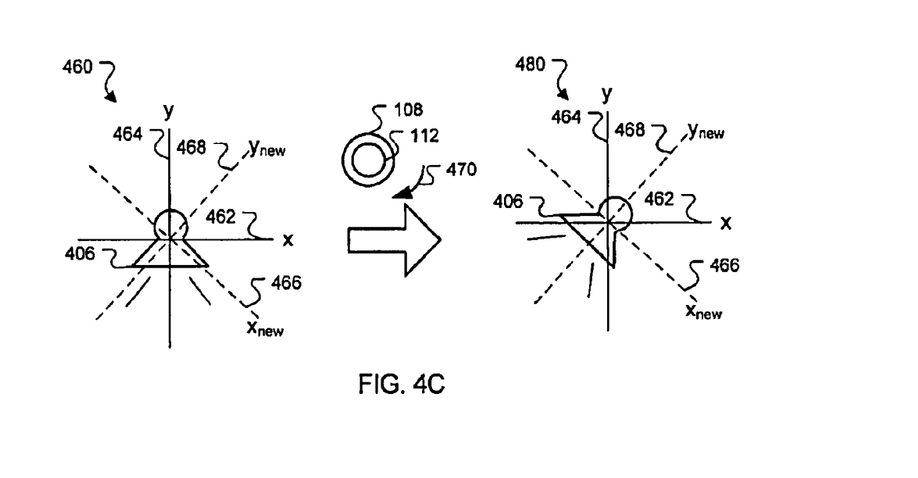

As shown in FIGS. 4A-4C, a user, for example, a graphic designer, can use the computer system 100 to manipulate 3D objects in addition to manipulating a virtual camera. FIG. 4A shows an exemplary 3D image 402 on the display 102. The 3D image 402 includes a house 404 and a light 406. The user can manipulate the 3D image 402 using the handheld pointing device 106 and the motion controller 108. For example, the user may move the light 406 in the 3D image 402 using the pointing device to select the house 404 and using the motion controller 108 to direct the light 406 to orbit around the house 404, where a profile of the light that is facing the house remains facing the house as the light orbits. In another example, the user can use the handheld pointing device 106 to select the light 406 and use the motion controller 108 to move the light 406 to the back of the house 404 along the z axis, where the x and y coordinates of the lights 406 are fixed when the light is selected, as shown in an image 408.

FIG. 4B shows the light 406 in a coordinate system 430 that includes an x-axis 432, a y-axis 436, and a z-axis 438. The position of the light 406 can be specified by a set of coordinates that are relative to the axes 432, 436, and 438. In some embodiments, the user can use the handheld pointing device 106 to select the light 406, where the selection fixes the x- and y- coordinates of the light 406. After the user selects the light 406, the user can press the handle 112 of the motion controller 108 to change the position of the light 406 along the z-axis 438.

The user can also change the orientation of the light 406. Two orientations 460 and 480 of the light 406 are shown in FIG. 4C. After selecting the light 406, for example, the user may desire to change the orientation of the light 406. In this example, the light 406 is originally oriented along an x-axis 462 and a y-axis 464, as shown by the orientation 460. The user may desire to orient the light 406 along an $x_{new}$-axis 466 and a $y_{new}$-axis 468. To do so, the user can first select the light 406 to fix the x- and y-coordinates of the light 406. Then, the user can rotate the handle 112 of the motion controller 108, as indicated by an arrow 470. The light's new orientation is shown as the orientation 480.

Figure 5:
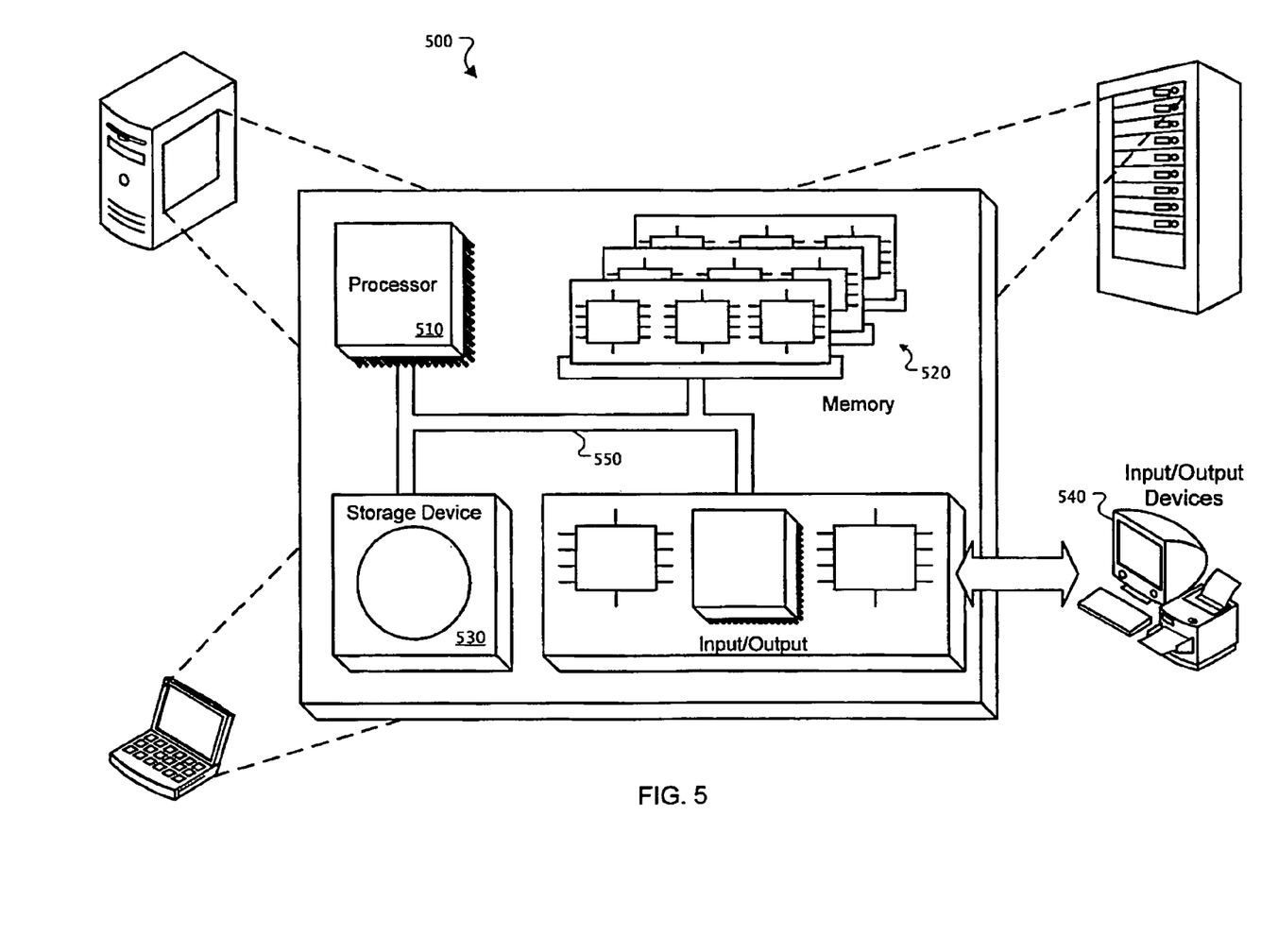
FIG. 5 is a schematic diagram of an exemplary computing system, according to some embodiments.

FIG. 5 is a schematic diagram of an exemplary computing system 500. The system 500 may be used to perform the method 300 described above, according to some embodiments. The system 500 may be included the computer system 100, or other computer systems that manipulate camera views of 3D objects.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In some embodiments, the processor 510 is a single-threaded processor. In some embodiments, the processor 510 may be a multi-threaded processor. The processor 510 is capable of processing instructions stored in the memory 520 or on the storage device 530 to display graphical information for a user interface on the input/output device 540, such as the display 102.

The memory 520 stores information within the system 500. In some embodiments, the memory 520 is a computer-readable medium. In some embodiments, the memory 520 is a volatile memory unit. In some embodiments, the memory 520 is a non-volatile memory unit.

The storage device 530 is capable of providing mass storage for the system 500. In some embodiments, the storage device 530 is a computer-readable medium. In various different embodiments, the storage device 530 may be a floppy disk device, a hard disk device, an optical disk device, or a tape device.

The input/output device 540 provides input/output operations for the system 500. In some embodiments, the input/output device 540 can include a keyboard, a pointing device (e.g., a mouse), and a 3D motion controller. In some embodiments, the input/output device 540 includes a display unit, such as the display 102, for displaying graphical user interfaces.

The features described in this disclosure can be implemented in digital electronic circuitry, or in computer hardware, firmware, software, or in combinations of them. The apparatus can be implemented in a computer program product tangibly embodied in a machine-readable storage device, for execution by a programmable processor; and method steps can be performed by a programmable processor executing a program of instructions to perform functions of the described embodiments by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard or keypad and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. For example, the use of the system 100 is not limited to graphical design, but it can be used to navigate other digital settings including video game environments.

Additionally, the selected object does not need to be stationary as the virtual camera is navigated around it. For example, a user could select the person 216 and drag the person across the display 102 using the mouse. At substantially the same time, the user could be manipulating the virtual camera around the person 216. The user can move the camera to keep the selected object at the desired angle or framing from the point of view of the virtual camera.

The degrees of freedom described above are only examples of the possible degrees of freedom that the devices may control. For example, additional degrees of freedom can include movement along an axis that permits an image panel (e.g., the entire screen shot of FIG. 2) to slide in horizontal or vertical directions. In another example, the degrees of freedom can include rotating images within the image panels (e.g., a billboard image within a screenshot) around an axis.

In another embodiment, the motion controller 108 controls an object's degrees of freedom and the pointing device 106 similarly constrains an aspect of the object's motion. For example, the pointing device can hold down the corner of a cube so that it temporarily pivots about the corner. The user may use the motion controller 108 to control how the cube to pivots around the selected point on the cube.

In yet other embodiments, a user may position the manipulated object (e.g., a virtual camera) in any fixed orientation relative to the selected object (e.g., a scene element). For example, a user may position a virtual camera so that it remains pointing directly away from a car object that is selected from the scene. When a user manipulates the virtual camera, the camera remains facing away from the car regardless of where the camera is located using the motion controller 108.

A manipulated object may be used as a virtual camera, where the user "sees" from a viewpoint of the manipulated object. For example, a computer-generated scene may include two cubes. A user can select one cube and manipulate another cube relative to the selected cube. The manipulated cube can be treated as a virtual camera, where a simulated viewpoint of the manipulated cube is displayed to the user.

In certain embodiments, either the selected object or the manipulated object (e.g., a virtual camera) are driven by procedural input, such as software, rather than directly by user input. For example, the movement of a virtual camera may be re-recorded or can be generated in real time (e.g., such as in a video game), and a user can use the pointing device to supplement, override, or fine-tune the movement of the camera. The user can select an object and the virtual camera can focus on the object as it is following the movements associated with the procedural input.

In another example, the operation of the pointing device is generated using procedural input and a user (e.g., animation artist) uses the controller to manipulate an object, such as a virtual camera. The user can position a selected object in the computer-generated environment, "mark" the constraining point, and then later manipulate the virtual camera as if the user was currently restraining the selected object. The saved "mark" acts as a procedural input that simulates user input from the pointing device, and the user is free to manipulate a second object relative to the selected object.

In other embodiments, different users can operate the pointing device and the motion controller. For example, one user can direct a virtual camera using the motion controller, while a remote user can select an object on which the camera should focus.

Although mentioned in the context of controlling objects and cameras in computer-generated environments, in other implementations, the described systems and techniques can be applied to any user input situation having multiple degrees of freedom, where constraining one or more of those degrees of freedom could improve user's ability to provide precise and controlled input. For example, the system and techniques can be applied in situations, such as PC or console video gaming, remote piloting of land/sea/air/spacecraft, endoscopy, arthroscopy, or generally surgery using electronically controlled instruments, etc.

Also, the logic flow depicted in FIG. 3 does not require the particular order shown, or sequential order, to achieve desirable results. In addition, although some acts may have been identified expressly as optional, other steps could also be added or removed as appropriate. Also, other steps may be provided, or steps may be eliminated, from the described flow, and other components may be added to, or removed from, the described systems. Accordingly, other embodiments are within the scope of the following claims.

What is claimed is:

1. A system for manipulating one object relative to another object in a computer generated environment comprising:
   a selection device for selecting an object in a computer-generated environment, wherein an object ray is defined as extending at least between a position of the object and a current camera position of a virtual camera;
   a navigation device separate from the selection device and configured for manipulation of the virtual camera in the computer-generated environment to define a desired perspective for the virtual camera; and
   a camera control system for (i) translating the virtual camera in the computer-generated environment in response to the manipulation, (ii) defining, in response to the translation, a desired ray in the computer-generated environment, the desired ray defined so that the position lies on the desired ray, and so that the desired ray corresponds to the desired perspective, and (iii) adjusting the virtual camera, in response to defining the desired ray, so that the object ray aligns with the desired ray, the adjustment placing the virtual camera in a second camera position.

2. The system of claim 1, wherein a user operates the selection device using one hand and the navigation device using a different hand.

3. The system of claim 1, wherein the navigation device has at least three degrees of freedom.

4. The system of claim 3, wherein at least two degrees of freedom include movement in directions parallel with an x and y-axis.

5. The system of claim 3, wherein each degree of freedom comprises a proper subset of possible displacements along an axis.

6. The system of claim 3, wherein each degree of freedom comprises a substantial entirety of a dimension associated with an axis.

7. The system of claim 3, wherein the selection device is selected from a group consisting of a mouse, a touchscreen, a joystick, a tablet and stylus, a trackball, and a keyboard.

8. The system of claim 3, wherein the navigation device includes a 3D motion controller.

9. The system of claim 3, wherein the navigation device has seven degrees of freedom with which to manipulate the virtual camera.

10. The system of claim 3, wherein the manipulation is restrained with regard to movements in directions parallel with an x and y-axis.

11. The system of claim 3, wherein the computer-generated environment is selected from a group consisting of a video game environment, a computer aided design environment, and a film animation environment.

12. A method for manipulating a virtual camera with regard to an object in a computer-generated environment using at least one device, the method comprising:

displaying a view of the computer-generated environment that includes the object at a position, the view generated using the virtual camera at a first camera position in the computer-generated environment;

defining an object ray in the computer-generated environment, the object ray extending at least between the position and a current camera position;

receiving input corresponding to (i) user selection of the object in the computer-generated environment using the at least one pointing device, and (ii) a user dragging motion with the at least one pointing device during the user selection, the user dragging motion defining a desired perspective for the virtual camera;

translating the virtual camera in the computer-generated environment in response to the input;

defining, in response to the translation, a desired ray in the computer-generated environment, the desired ray defined so that the position lies on the desired ray, and so that the desired ray corresponds to the desired perspective;

adjusting the virtual camera, in response to defining the desired ray, so that the object ray aligns with the desired ray, the adjustment placing the virtual camera in a second camera position; and     displaying an updated view of the computer-generated environment that includes the object at the position, the view generated using the virtual camera having the second camera position in the computer-generated environment.

13. The method of claim 12, wherein the computer-generated environment is selected from a group consisting of a video game environment, a computer aided design environment, and a film animation environment.

14. The method of claim 12, wherein the input is made using at least one device selected from a group consisting of a mouse, a touchscreen, a joystick, a tablet and stylus, a trackball, a 3D motion controller, and a keyboard.

15. A computer program product tangibly embodied in a non-transitory machine-readable storage device, the computer program product including instructions that, when executed, perform a method for manipulating a virtual camera with regard to an object in a computer-generated environment using a pointing device, the method comprising:

displaying a view of the computer-generated environment that includes the object at a position, the view generated using the virtual camera at a first camera position in the computer-generated environment;

defining an object ray in the computer-generated environment, the object ray extending at least between the position and a current camera position;

receiving input corresponding to (i) user selection of the object in the computer-generated environment using the at least one pointing device, and (ii) a user dragging motion with the at least one pointing device during the user selection, the user dragging motion defining a desired perspective for the virtual camera;

translating the virtual camera in the computer-generated environment in response to the input;

defining, in response to the translation, a desired ray in the computer-generated environment, the desired ray defined so that the position lies on the desired ray, and so that the desired ray corresponds to the desired perspective;

adjusting the virtual camera, in response to defining the desired ray, so that the object ray aligns with the desired ray, the adjustment placing the virtual camera in a second camera position; and     displaying an updated view of the computer-generated environment that includes the object at the position, the view generated using the virtual camera having the second camera position in the computer-generated environment.

\* \* \* \* \*